United States Patent
Li et al.

(10) Patent No.: US 12,524,980 B2
(45) Date of Patent: Jan. 13, 2026

(54) MULTITASK OBJECT DETECTION SYSTEM FOR DETECTING OBJECTS OCCLUDED IN AN IMAGE

(71) Applicant: QUALCOMM Incorporated, San Diego, CA (US)

(72) Inventors: Yuan Li, San Diego, CA (US); Lei Wang, San Diego, CA (US); Leulseged Tesfaye Alemu, San Diego, CA (US); Dashan Gao, San Diego, CA (US); Ning Bi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 486 days.

(21) Appl. No.: 18/069,993

(22) Filed: Dec. 21, 2022

(65) Prior Publication Data
US 2024/0212308 A1  Jun. 27, 2024

(51) Int. Cl.
*G06V 10/26* (2022.01)
*G06V 10/77* (2022.01)
*G06V 10/82* (2022.01)
*G06V 40/16* (2022.01)

(52) U.S. Cl.
CPC ........ *G06V 10/267* (2022.01); *G06V 10/7715* (2022.01); *G06V 10/82* (2022.01); *G06V 40/172* (2022.01)

(58) Field of Classification Search
CPC .. G06V 10/267; G06V 10/7715; G06V 10/82; G06V 40/172; G06V 20/593; G06V 40/103; G06V 10/25; G06V 10/454; G06V 10/764; G06V 20/20; G06V 40/107; G06V 40/161; G06V 40/171
See application file for complete search history.

(56) References Cited

U.S. PATENT DOCUMENTS

| | | | |
|---|---|---|---|
| 2018/0276824 A1* | 9/2018 | Haraden | G06T 15/20 |
| 2022/0262093 A1* | 8/2022 | Zhou | G06V 10/7715 |
| 2022/0300774 A1* | 9/2022 | Liu | G06V 10/82 |
| 2024/0005637 A1* | 1/2024 | Iqbal | G01C 21/3807 |
| 2024/0371082 A1* | 11/2024 | Goyal | C10G 57/02 |

OTHER PUBLICATIONS

Anonymous: "GitHub—Ageitgey/Face_Recognition: The World's Simplest Facial Recognition Api for Python and the Command Line", Apr. 2, 2018, XP93117760, pp. 1-8.
International Search Report and Written Opinion—PCT/US2023/077434—ISA/EPO—Jan. 29, 2024.
(Continued)

*Primary Examiner* — Wassim Mahrouka
(74) *Attorney, Agent, or Firm* — Polsinelli LLP/QUALCOMM INCORPORATED

(57) ABSTRACT

System and techniques are described herein for processing images to detect objects in the provided images. In one illustrative example, a method of processing image data includes obtaining an image including at least a first object. The method can include generating a feature map based on providing the image to a neural network. The method can further include identifying a plurality of objects based on the feature map, the plurality of objects including a first part of the first object. The method can include identifying a first set of object parts within the plurality of objects corresponding to the first object.

21 Claims, 10 Drawing Sheets

(56) References Cited

OTHER PUBLICATIONS

Qiu J., et al., "Assessing Individual Dietary Intake in Food Sharing Scenarios with a 360 Camera and Deep Learning", 2019 IEEE 16th International Conference on Wearable and Implantable Body Sensor Networks (BSN), IEEE, May 19, 2019, XP033579922, 4 pages, section II, figure 1.

Ragel R., et al., "Multi-Modal Data Fusion for People Perception in the Social Robot Haru", Dec. 13, 2022, XP047648483, pp. 174-187, section 3.

Zhou H., et al., "Body-Part Joint Detection and Association Via Extended Object Representation", arXiv:2212.07652v1 [cs.CV], Arxiv.Org, Cornell University Library, 201 Olin Library Cornell University Ithaca, NY 14853, Dec. 15, 2022, XP091395086, 6 pages, section 3, figures 1,2.

* cited by examiner

MULTITASK OBJECT DETECTION SYSTEM FOR DETECTING OBJECTS OCCLUDED IN AN IMAGE

FIELD

The present disclosure generally relates to object detection by neural networks. In some examples, aspects of the present disclosure are related to a multitask object detection system for detecting objects occluded in an image.

BACKGROUND

Deep neural networks, particularly convolutional neural networks, are used for object detection. Convolutional neural networks are able to extract high-level features, such as facial shapes, from an input image, and use these high-level features to output a probability that, for example, an input image includes a dog, a cat, a boat, or a bird. An artificial neural network attempts to replicate, using computer technology, logical reasoning performed by biological neural networks.

While convolutional neural networks can identify objects within the scene, many of the objects can have relationships. However, identification of relationships within an input image can be difficult and objects can be incorrectly detected due to occlusion or other causes. For example, some parts of a human may be miss detected due to occlusion or other causes, and body part detection is not as accurate as face detection.

SUMMARY

In some examples, systems and techniques are described for detecting objects that are occluded in an image. The systems and techniques can improve the identification of objects and sub-features of those objects when the objects are at least partially occluded.

According to at least one example, a method is provided for processing images. The method includes: obtaining an image including at least a first object; generating a feature map based on providing the image to a neural network; identifying a plurality of objects based on the feature map, the plurality of objects including a first part of the first object; and identifying a first set of object parts within the plurality of objects corresponding to the first object.

In another example, an apparatus for processing images is provided that includes at least one memory and at least one processor coupled to the at least one memory. The at least one processor is configured to: obtain an image including at least a first object; generate a feature map based on providing the image to a neural network; identify a plurality of objects based on the feature map, the plurality of objects including a first part of the first object; and identify a first set of object parts within the plurality of objects corresponding to the first object.

In another example, a non-transitory computer-readable medium is provided that has stored thereon instructions that, when executed by one or more processors, cause the one or more processors to: obtain an image including at least a first object; generate a feature map based on providing the image to a neural network; identify a plurality of objects based on the feature map, the plurality of objects including a first part of the first object; and identify a first set of object parts within the plurality of objects corresponding to the first object.

In another example, an apparatus for processing images is provided. The apparatus includes: means for obtaining an image including at least a first object; means for generating a feature map based on providing the image to a neural network; means for identifying a plurality of objects based on the feature map, the plurality of objects including a first part of the first object; and means for identifying a first set of object parts within the plurality of objects corresponding to the first object.

In some aspects, one or more of the apparatuses described herein is, is part of, and/or includes a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a vehicle or a computing system, device, or component of a vehicle, a wearable device (e.g., a network-connected watch or other wearable device), a wireless communication device, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
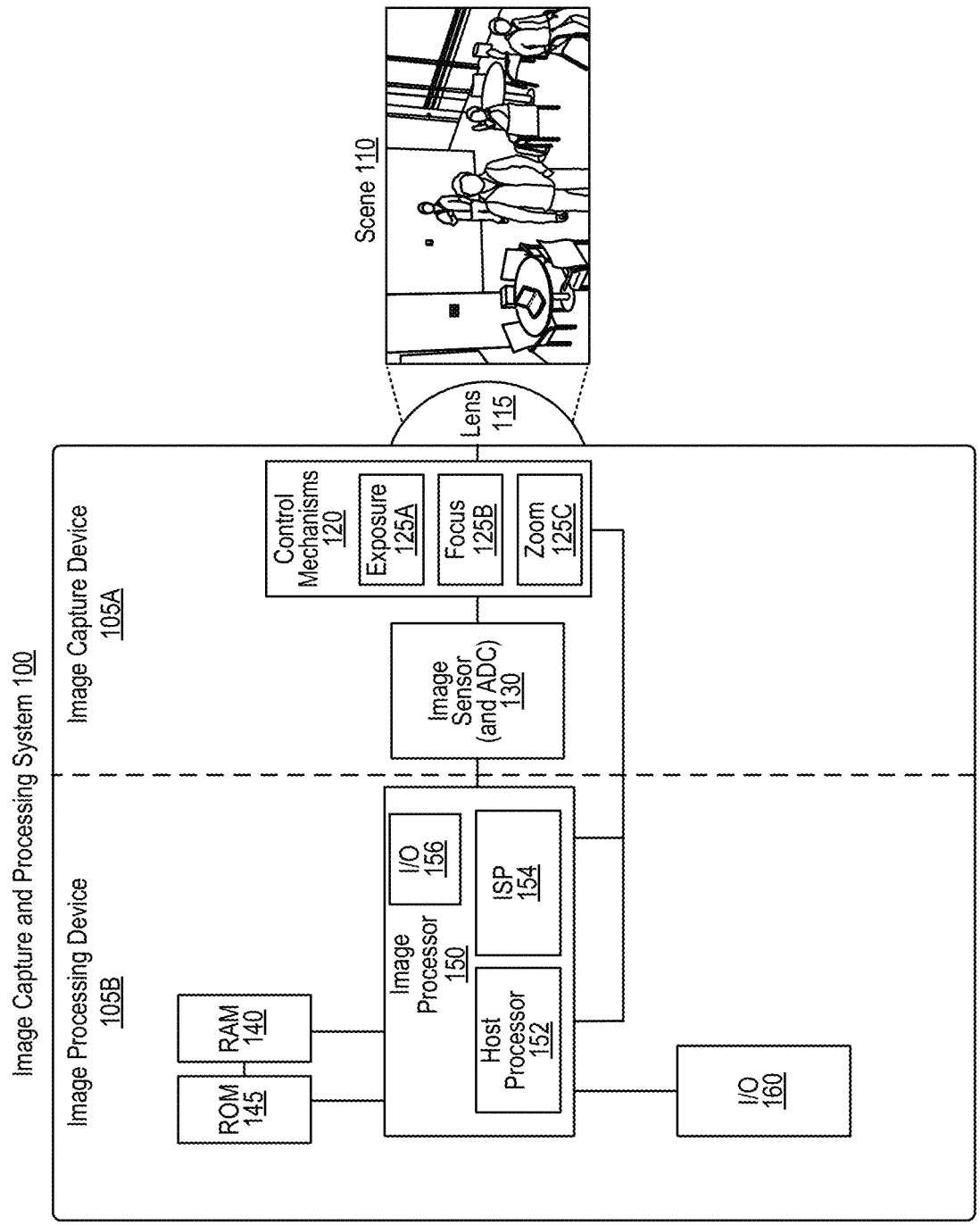
FIG. 1 is a block diagram illustrating an architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during the capture of one or more image frames, such as ISO, exposure time, aperture size, f/stop, shutter speed, focus, and gain. For example, settings or parameters can be applied to an image sensor for capturing the one or more image frames. Other camera settings can configure the post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Computer vision is an important task that can be performed by computer systems to perform various tasks such as detecting human occupancy, identifying a person, tracking a person's movement, and so forth. One type of computer vision is facial recognition based on facial landmark detection, which involves localizing key (e.g., important or relevant) facial points in image frames. Key facial points can include a corner of an eye, a corner of a mouth, and the tip of a nose, among other facial points. The locations of detected facial landmarks can characterize and/or indicate the shape of a face (and the shape of one or more facial features, such as a nose or mouth). Computer vision can also identify other parts of a person, such as hands, body center, and feet, to track the person. Computer vision can be employed for many purposes, such as to identify object movement within the environment to enable an autonomous device to safely navigate the scene.

Understanding complex object activity is a challenging and critical task for devices and systems that implement computer vision. For example, an autonomous vehicle (AV) track peoples to prevent the AV from striking a person crossing the street. Computer vision often requires further comprehension after detecting different objects, such as after separately detecting multiple people's bodies, faces, and hands. Parts of an object such as a human may be incorrectly detected due to various causes such as body detection, which is not as accurate as facial detection. Occlusion within the image can often cause incorrect identification of parts of an object, such as a person, to be incorrectly associated with the incorrect object.

The present disclosure describes systems, apparatuses, methods, and computer-readable media (collectively referred to as "systems and techniques") for performing human part association in an image. For example, the systems and techniques may identify the body parts of a person and associate the different body parts with each person. Aspects of the disclosure include generating a feature map of an object and identifying different features from the feature map. An example of an object is a person, but the object could also be another mammal or another animated object such as a vehicle, a robot, and so forth. In the case of a person, the systems and techniques may identify the face, hands, body center, feet, and other features of a person. When the body parts of a person can be identified from the feature map, the systems and techniques can associate each object with the person by constructing a cost function. The systems and techniques can associate the different objects with a body part based on the cost function (e.g., using a Hungarian algorithm). The systems and techniques can also generate a region corresponding to a person based on the identification of the person's body parts to enable tracking of the person in the next image.

The systems and techniques may also perform object association in an image when an object is occluded and creates challenging visual conditions. For example, a person in the foreground may have body parts that at least partially overlap with a person in the background. The systems and techniques may be configured to construct a person container using body part association to cause detection of at least one body part to enable detection of the whole person for tracking, activity understanding, and other tasks. In one aspect, the systems and techniques determine the depth of the body parts to disambiguate the foreground person and their corresponding body parts from the background person and their corresponding body parts. The systems and techniques can determine that at least one body part may be incorrectly identified. In this case, the systems and techniques can also determine a depth of each object and construct a cost function that incorporates the depth. The systems and techniques can associate the different objects with a body part based on the cost function (e.g., using a Hungarian algorithm). The systems and techniques can also generate a region corresponding to the foreground person and the background person based on identification of each person's body parts.

Additional details and aspects of the present disclosure are described in more detail below with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image capture and processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for PDAF. In some cases, the opaque and/or reflective masks may be used to block portions of the electromagnetic spectrum from reaching the photodiodes of the image sensor (e.g., an IR cut filter, an ultraviolet (UV) cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 10:
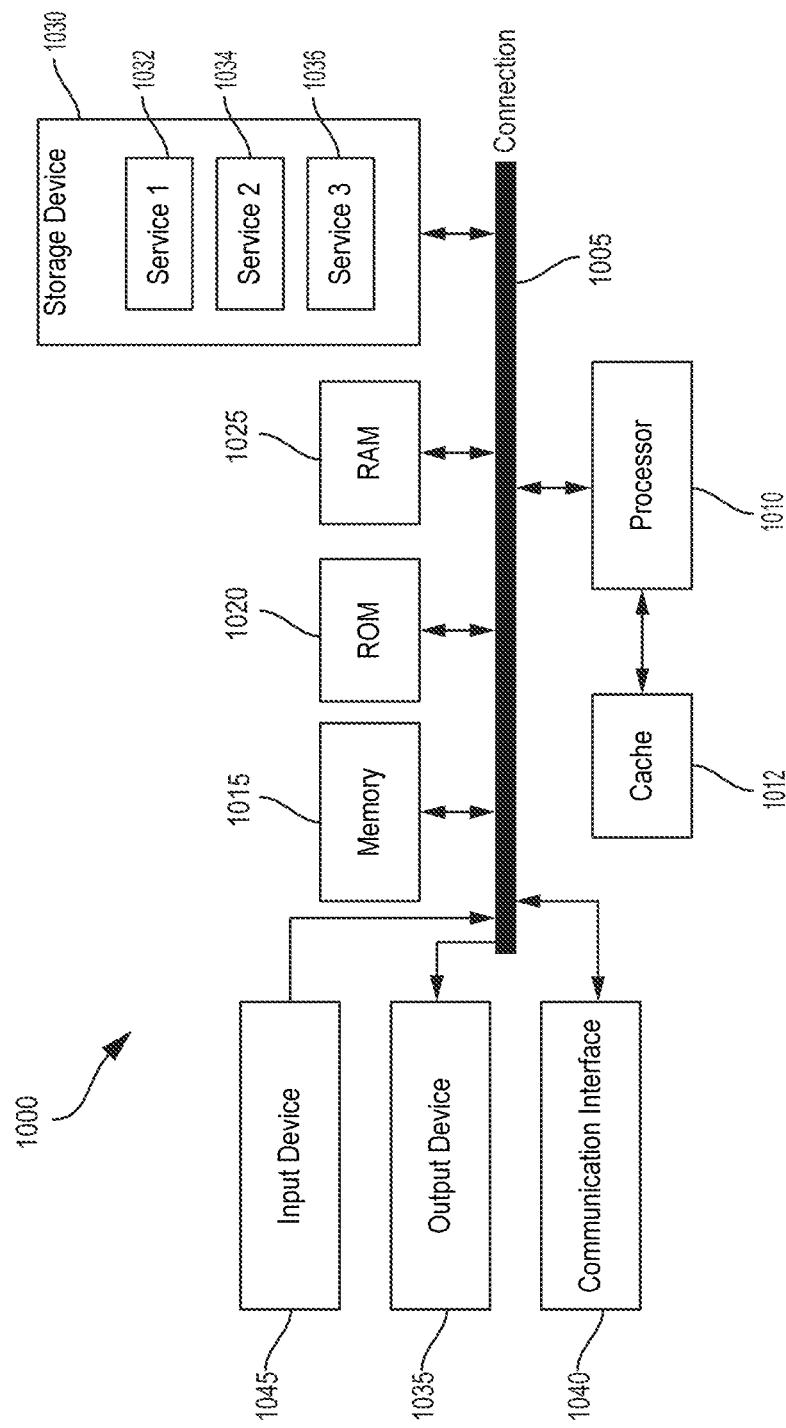
FIG. 10 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1010 discussed with respect to the computing system 1000 of FIG. 10. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), digital signal processors (DSPs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 1 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some examples, the computer vision system of FIG. 3 (described below) can include the image capture and processing system 100, the image capture device 105A, the image processing device 105B, or a combination thereof.

In various aspects, provided are systems, methods, and computer-readable mediums for a neural network architecture that uses deconvolution to preserve spatial information. In various aspects, the neural network architecture includes one or more deconvolution operations, performed in deconvolution layers. Higher-level feature maps, which can have a lower resolution than lower-level feature maps, can be up-sampled or up-scaled using a deconvolution operation in a deconvolution layer. The higher-resolution feature maps produced by a de-convolutional layer can then be combined with feature maps produced by the convolution layers. The combined feature maps can then be used to determine an output prediction.

A convolutional neural network that uses deconvolution to preserve spatial information can have better performance than convolutional neural networks that do not include deconvolution. Better performance can be measured, for example, in terms of the network's accuracy in identifying the contents of image data. For example, a convolutional neural network with deconvolution may have better accuracy when the object to be identified is small in comparison to the dimensions of the input image.

Adding deconvolution to particularly to small neural networks can improve the accuracy of these neural networks. Small neural networks have fewer layers and/or perform depth-wise convolution, and thus need to perform fewer computations. Deep neural networks can execute a very large number of computations and can generate a large amount of intermediate data. Deep neural networks have thus been run using systems that have a large amount of processing capability and storage space. Mobile devices, such as smart phones, tablet computers, laptops, and other devices that are intended to be easy to transport, however, may have less powerful processors and may have less storage space due to factors such as the size of the device, available battery power, and need for the device to be lightweight. Smaller neural networks may be used in resource-limited applications. Smaller neural networks may be less accurate than deep neural networks, thus techniques such as those discussed herein can be applied to improve the prediction accuracy of small neural networks.

An artificial neural network attempts to replicate, using computer technology, logical reasoning performed by the biological neural networks that constitute animal brains. Neural networks fall within a sub-field of artificial intelligence called machine learning. Machine learning is a field of study that investigates giving computers the ability to learn without being explicitly programmed. A software program that is explicitly programmed must account for all possible inputs, scenarios, and outcomes. In contrast, a software program that uses machine learning algorithms learns by being given inputs and receiving feedback as to the correctness of the output the program produces. The feedback is incorporated into the program, so that the program can produce a better result for the same or similar input.

Neural networks take inspiration from the mechanics of the operation of the human brain, to the extent that these operations are understood. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight and is considered a way a brain can learn, with different weights resulting from different responses to input. Learning can change the weights, but the organization of the neurons and synapses need not change to obtain the learning. The static structure of the neural networks is used as a model for a program, and the weights can reflect a task or tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. In some aspects, by analogy, a node of a neural network can apply a non-linear function to the weighted sum of the values input into the node.

Figure 2:
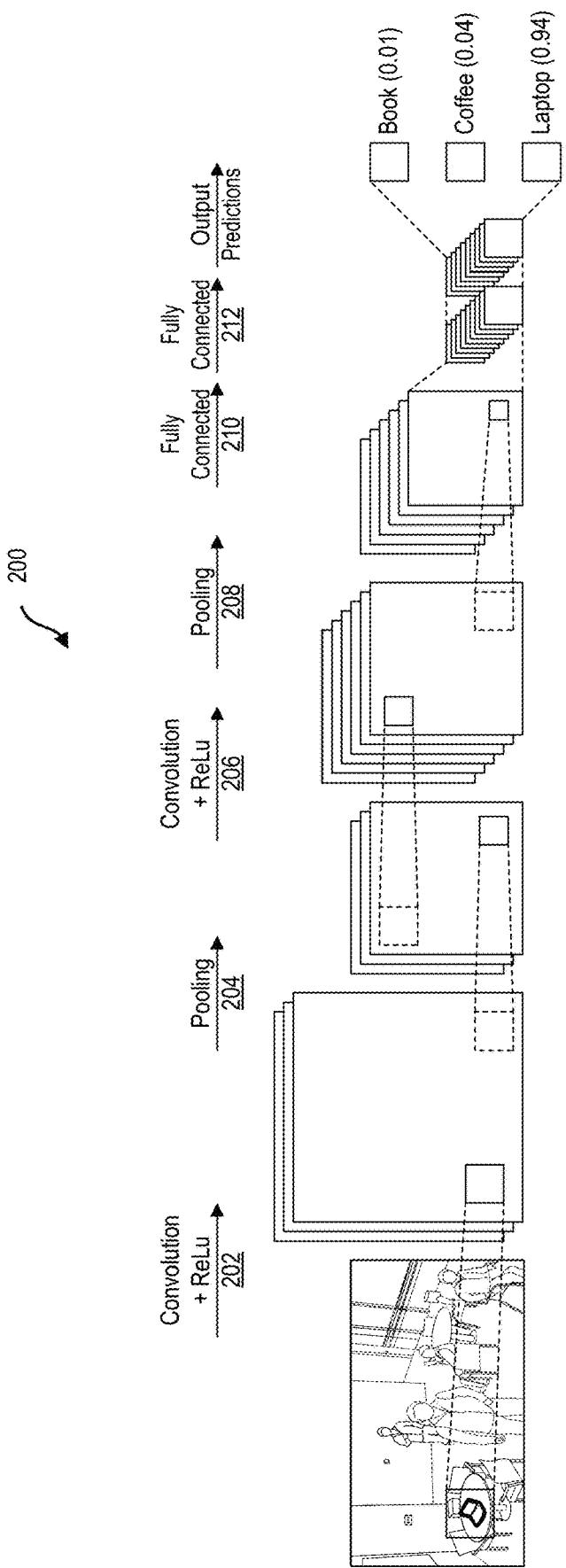
FIG. 2 is a diagram illustrating an example of a model for a convolutional neural network.

FIG. 2 is a diagram illustrating a model 200 of a convolutional neural network. The model 200 illustrates operations that can be included in a convolutional neural network: convolution, activation, pooling or sub-sampling, batch normalization, and output generation (e.g., a fully connected layer). Any given convolutional network includes at least one convolution layer, and can have tens of convolution layers. Additionally, each convolutional layer need not be followed by a pooling layer. In some examples, a pooling layer may occur after multiple convolution layers, or may not occur at all. The example convolution network illustrated in FIG. 2 classifies an input image 220 into one of three categories: book, coffee, or laptop. In the illustrated example, on receiving an image as input, the example neural network outputs the highest probability for "laptop" (0.94) among the output predictions 214.

To produce the illustrated output predictions 214, the example convolutional neural network performs a first convolution with a rectified linear unit (ReLU) 202, pooling 204, a second convolution with ReLU 206, additional pooling 208, and then categorization using two fully-connected layers. In the first convolution with ReLU 202 step, the input image 220 is convoluted to produce one or more output feature maps 222. The first pooling 204 operation produces additional feature maps, which function as input feature maps 224 for the second convolution and with ReLU 206 operation. The second convolution with ReLU 206 operation produce a second set of output feature maps 226. The second pooling 208 step also produces feature maps 228, which are input into a first fully-connected 210 layer. The output of the first fully-connected 210 layer is input into a second fully-connected 212 layer. The outputs of the second fully-connected 212 layer are the output predictions 214. In convolutional neural networks, the terms "higher layer" and "higher-level layer" refer to layers further away from the input image (e.g., in the example model 200, the second fully-connected 212 layer is the highest layer).

Other aspects can include additional or fewer convolution operations, ReLU operations, pooling operations, and/or fully-connected layers. Convolution, non-linearity (e.g., ReLU), pooling or sub-sampling, and categorization operations will be explained in greater detail below.

When conducting image recognition, a convolutional neural network operates on a numerical or digital representation of the image. An image can be represented in a computer as a matrix of pixel values. For example, a video frame captured at 1080p includes an array of pixels that is 1920 pixels across and 1080 pixels high. Certain components of an image can be referred to as a channel. For example, a color image has three channels: red, green, and blue. In this example, a color image can be represented as three two-dimensional matrices, one for each color, with the horizontal and vertical axis indicating a pixel's location in the image and a value between 0 and 255 indicating a color intensity for the pixel. As another example, a greyscale image has only one channel and thus can be represented as a single two-dimensional matrix of pixel values. In this example, the pixel values can also be between 0 and 255, with 0 indicating black and 255 indicating white, for example. The upper value of 255, in these examples, assumes that the pixels are represented by 8-bit values. In other examples, the pixels can be represented using more bits (e.g., 16, 32, or more bits), and thus can have higher upper values.

Convolution is a mathematical operation that can be used to extract features from an input image. Features that can be extracted include, for example, edges, curves, corners, blobs, and ridges, among others. Convolution preserves the spatial relationship between pixels by learning image features using small squares of input data.

In some aspects, MobileNet is an example of a convolutional neural network that is optimized for mobile vision applications and other environments with low computation capacity such as embedded devices. In this aspect, the convolutional units from MobileNet and some extra convolutional units are used to generate feature maps. The highest-level (and smallest) feature map was then up-sampled by a de-convolutional layer and combined with a feature map of the same size, using a lateral concatenation operation. Several combined feature maps with different resolutions may also be generated. The combined feature maps and the highest-level feature map may be used for object detection.

Figure 3:
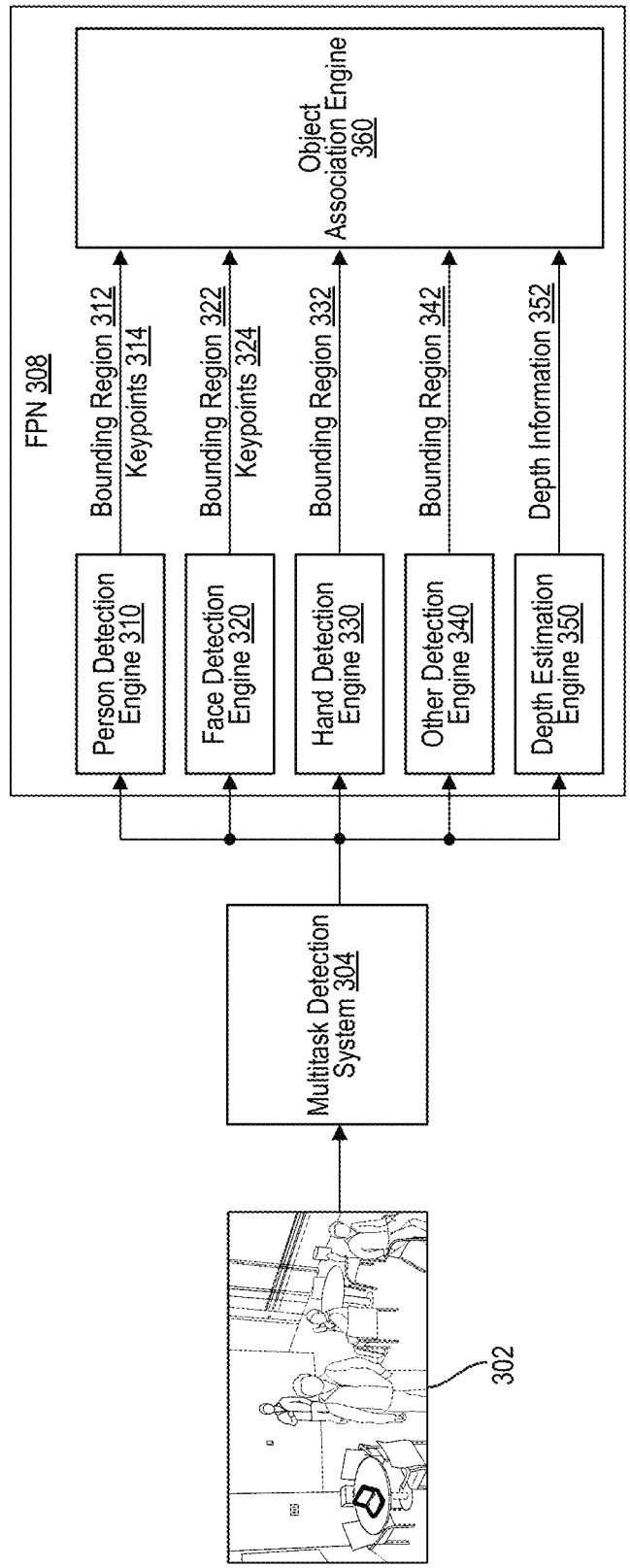
FIG. 3 is a conceptual diagram illustrating an architecture of a computer vision system 300 according to various aspects of the disclosure.

FIG. 3 is a conceptual diagram illustrating an architecture of a computer vision system 300 according to various aspects of the disclosure. In some aspects, an input image 302 is provided to a multitask detection system 304 of the computer vision system 300 for detecting various objects within the input image 302. The multitask detection system 304 can operate as a feature extraction backbone for extracting features from one or more images, including the input image 302. The extracted features can be output from the multitask detection system 304 to a feature pyramid network (FPN) 308. In one illustrative aspect, the multitask detection system 304 comprises a neural network, such as the convolution neural network that includes one or more neural networks configured to detect objects, perform depth estimation, and/or perform other tasks. Non-limiting examples of objects include faces, body parts of a person, different mammals (dogs, cats, etc.), animated objects (e.g., cars, bicycles, etc.), and stationary objects (coffee, food, etc.).

As noted above, according to some aspects, input images (including input image 302) are processed by the multitask detection system 304 to extract features from the input images. The extracted features are provided to the FPN 308. The FPN 308 is configured to use different features from the multitask detection system 304 and detect objects and/or predict depth from the images using a plurality of detection engines. In one aspect, the FPN 308 can be configured to detect an object such as a person. In this case, the FPN 308 may include a person detection engine 310 for detecting a body of a person, a face detection engine 320 for detecting the face of the person, a hand detection engine 330 for detecting the hands of the person, another detection engine 340 for detecting other objects relevant to the image, and a depth estimation engine 350 for estimating a depth of the objects in the image.

In some aspects, the person detection engine 310 is configured to detect a body of the person. If a body is detected, the person detection engine 310 provides a bounding region 312 that identifies an area of the image corresponding to the body and keypoints 314 that identify landmark features corresponding to the body.

In one aspect, the face detection engine 320 is configured to detect a face of a person. If a face is detected, the face detection engine 320 is configured to provide a bounding region 322 that identifies an area of the image corresponding to the face of the person and keypoints 324 that identify landmark features corresponding to the face. For example, the keypoints 324 can identify features such as the nose, the eyes, the mouth, and so forth.

The hand detection engine 330 is configured to detect the hands of a person. If one or more hands are detected, the hand detection engine 330 provides at least one bounding region 332 corresponding to the detected hand. In some cases, the hand detection engine 330 may also keypoints that identify landmark features of the hands.

The detection engine 340 is configured to detect other objects relevant to the image. For example, the detection engine 340 can detect an object proximate to or held by a person, such as a cup of coffee. For example, the computer vision system 300 may be implemented in a security system and the detection engine 340 can be configured to detect a person holding a badge with authentication information such as a picture of the person. The security system can authenticate the person based on the picture on their badge based on the identification of the other object. In this aspect, when the detection engine 340 detects an object, the detection engine 340 is configured to provide at least one bounding box 342 relevant to the detected object in the image.

The depth estimation engine 350 is configured to estimate the depth of features within the image and provide depth information 352. In one illustrative example, the depth information is a bitmap that identifies a depth of various features within the image.

An example implementation of a neural network that can be used by the multitask detection system 304, the various detection engines 310, 320, 330, 340, and/or the depth estimation engine 350 as a feature extraction backbone (e.g., for extracting features from input images, including input image 302) is a Mobilenet neural network. In some aspects, a Mobilenet neural network uses squeeze and excitation blocks to adaptively recalibrate channel-wise feature responses by modelling interdependencies between channels, which can improve the speed of the inference. In some cases, standard convolutions can be used for the Mobilenet neural network instead of depth-wise separable convolutional layers. For example, depth-wise separable convolution can provide great efficiency on CPUs, they may be less accurate and may not possess the same speed advantage on processing units with highly parallel structures, such as a GPU, DSP, NPU, etc., which are commonly used implementing for neural networks. In some cases, the convolutional channel numbers can be adjusted to 32 multiples, to maximize usage of hardware memory layout. In some cases, Mobilenet includes squeeze and excitation blocks. A squeeze and excitation block takes an input such as a three-dimensional (3D) tensor vector and squeezes the tensor vector into a one-dimensional (1D) vector, and the 1D vector is reverted back into its original value. In one aspect, squeeze and excitation blocks may not be supported in the hardware or a library including software support for squeeze and excitation blocks may not be available to the developer. In some aspects, the multitask detection system 304, the various detection engines 310, 320, 330, 340, and/or the depth estimation engine 350 may include a joint attention module (JAM) (e.g., instead of squeeze and excitation blocks) that is configured to perform a similar function as the squeeze and excitation block and is discussed in FIG. 6 below.

In one illustrative aspect, the JAM maintains the weights and the height dimensions and instead uses 1×1 convolutions to decrease the number of channels. For example, using the 1×1 convolution, the JAM can perform a channel-wise attention similar to a cross-attention between different channels in a squeeze and excitation block. Another convolution can be performed to return the information to the original dimensions. In a further aspect, the JAM may implement a clip ReLU in place of a sigmoid operation. A sigmoid operation is a non-linear operation and a ReLU clip is a linear operation that clips input values between 0 and 1 to approximate a normalization function performed by a sigmoid operation. However, the clip ReLU is much faster than a sigmoid operation. In some aspects, the functions performed by the JAM may be performed in hardware, which can increase their efficiency over software computation.

The FPN 308 includes an object association engine 360 that is configured to associate the various detected objects within the image. For example, the object association engine 360 is configured to associated different detected parts of a person (e.g., hands, feet, etc.). In some aspects, the object association engine 360 is configured to construct a container (e.g., a bounding box) that encompasses an area corresponding to the object and its associated objects. For example, in the case of detecting a person, the object association engine 360 can identify the various objects (e.g., hand, face, body, etc.) and determine an area including the person. In some aspects, the containers can overlap. For example, a person in the foreground may be standing in front of a person in the background, and the foreground person and the background person at least partially overlap.

Figure 4:
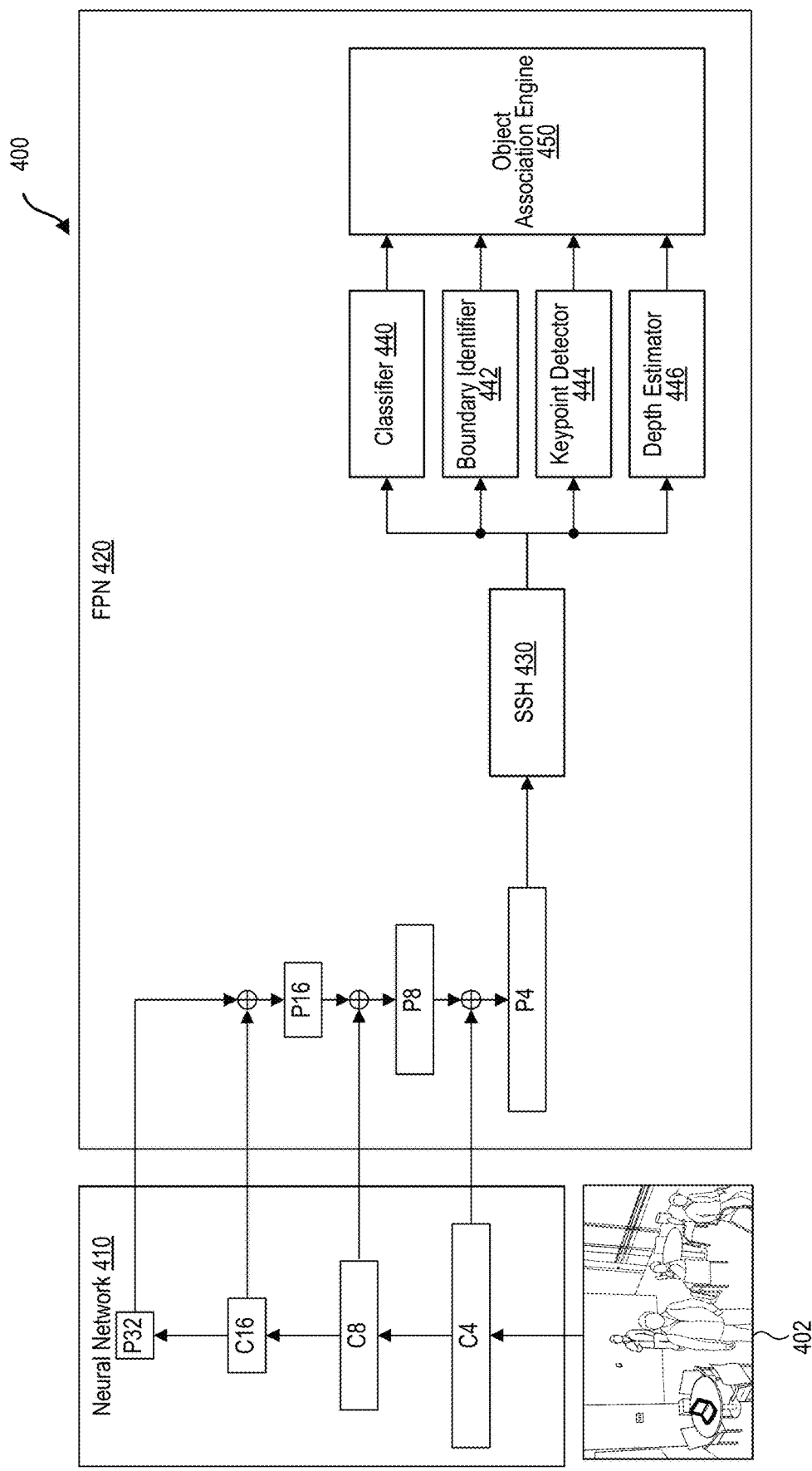
FIG. 4 illustrates a block diagram of a computer vision system 400 for performing object part association according to various aspects of the disclosure.

FIG. 4 illustrates a block diagram of a computer vision system 400 for performing object part association according to various aspects of the disclosure. In some aspects, the computer vision system 400 is configured to identify objects and parts of that object. For example, the computer vision system 400 may be configured to identify a person and at least one body part of that object.

In one aspect, the computer vision system 400 includes a neural network 410 that is configured to perform various computer vision tasks such as generating various images at different layers of the neural network 410. For example, an image 402 is provided into the neural network 410 and the neural network 410 performs various operations such as downsampling the image 402 to remove features from the image 402. As illustrated in FIG. 4, the neural network 410 generates features maps that are denoted by C and provides the feature maps to the FPN 420. In some aspects, the number following the C (e.g., 4, 8, etc.) indicates an amount of downsampling provided by the corresponding layer of the neural network 410. In this case, the C4 feature map corresponds to the image reduced by a factor of four and the C4 feature map has a $\frac{1}{4}^{th}$ of the original image size. The convolution reduces the number of features available in the C4 feature map. Similarly, the C8 feature map corresponds to the image reduced by a factor of 8 (e.g., $\frac{1}{8}^{th}$ of the original size), the C16 feature map corresponds to the image reduced by a factor of 16 (e.g., $\frac{1}{16}^{th}$ of the original size), and the P32 feature map corresponds to the image reduced by a factor of 32 (e.g., $\frac{1}{32}^{th}$ of the original size). In this case, the C8 feature map follows the C4 feature map in the neural network 410, the C16 feature map follows the C8 feature map in the neural network 410, and the P32 feature map follows the C16 feature map. In some aspects, upscaling can be achieved by a deconvolution or a bilinear sampling process.

In some aspects, the C4, C8, C16, and P32 feature maps are provided to the FPN 420. The FPN 420 fuses features from different output layers at different scales. For example, the P32 feature map is upscaled and merged with the C16 feature map to produce the P16 feature map. The P16 feature map is upscaled and merged with the C8 feature map, and the P8 feature map is upscaled and merged with the C4 feature map. In some aspects, the number of features being searched for corresponds to the number of feature maps that are extracted from the neural network 410. For example, the computer vision system 400 may be configured to search for a person, a face, hands, and feet and would have four feature maps from the neural network 410.

The FPN 308 provides the P4 feature map to a single shot headless (SSH) 430 component. The SSH 430 comprises several convolutions, batch normalizations, and activations to enhance the visual representation of various features within the P4 feature map. In one aspect, convolutions, batch normalizations, and activations correspond to a ReLU block and provide additional parameters of the SSH 430 that can be learned to improve the visual representation of the features. In one illustrative example, the SSH 430 can perform the function of 5×5 and 7×7 convolutions by using multiple serial 3×3 convolutions. In this aspect, the SSH 430 produces a feature map from the image 402 that is provided to a classifier 440, a boundary identifier 442, a keypoint detector 444, and a depth estimator 446.

In some aspects, the classifier 440 is configured to classify objects within the image, such as the parts of the human body (e.g., person, face, hands, etc.). For example, the classifier 440 can include at least a part of the person detection engine 310, the face detection engine 320, the hand detection engine 330, and the detection engine 340. The classifier 440 is configured to produce a heatmap that identifies a point associated with the object.

In some aspects, the boundary identifier 442 is configured to identify a boundary region, such as a bounding box, that encompasses the area corresponding to each classified object in the image. For example, the boundary identifier 442 may be configured to regress four bounding box coordinates (e.g., top, bottom, left, right) to identify the corresponding region. In this case, if the heatmap provided by the classifier 440 includes one pixel that has a response, the pixel indicates that the person or object is detected and the pixel can be sampled at the location of the corresponding bounding box.

In some aspects, the keypoint detector 444 is configured to identify relevant keypoints associated with at least some of the classified objects in the image, and the depth estimator 446 is configured to determine the depth of each classified object in the image. In this case, the keypoint detector 444 can have a number of regression targets based on features to be identified, such as fingers, hands, wrist, face, feet, and so forth. The keypoints from the keypoint detector 444 can be sampled from the class center (e.g., from the classifier 440) to identify features (e.g., mouth, eyes, lips) or body joint locations (e.g., wrist, shoulder, etc.).

An object association engine 450 is configured to identify and associate the different objects detected by the classifier 440 into a complete object. For example, in the case the object is a person, the object association engine 450 is configured to associate body parts (e.g., face, hands, body) with a person, and the object association engine 450 is configured to generate a container corresponding to that person. In some aspects, the object association engine 450 is configured to generate multiple containers that overlap, such as a person in the foreground that at least partially overlaps a person in the background.

In one aspect, the object association engine 450 is configured to associate the parts of the object with the object. An illustrative example of a person is further described, but the object association engine 450 may be configured to associate other parts of other objects, such as an animal or a moving object. In one aspect, the object association engine 450 uses the keypoint of the person's body to associate the other parts of the person based on a distance from that keypoint to other detected objects, such as the bounding boxes and the keypoints. In the case of the face of the person, the object association engine 450 uses a keypoint associated with the head (e.g., a center point on the head, or other point on the head) to determine a distance from the head to the body (e.g., a center point on the body, or other point on the body). In the case of hands, the object association engine 450 may determine a center point of the hands (e.g., an average of keypoints that identify the hand boundary) to associate the hands with the body using the body keypoints, which includes both of the hand locations. In some aspects, a hand bounding box, which includes center point of the hand, and body keypoints, which includes two hand keypoints) may be separately output from the neural network. For example, the body keypoints may be regressed or sampled from the body center, the association among keypoints, body center point, and the body boundary may be known and objection association engine 450 may be configured to determine an association between hands and body based on hand's center and body keypoint.

After constructing the distances, two cost functions illustrated in Equation 1 are constructed for face and hands that identifies a cost of associating the different features $$\text{cost}(B_i^c, P_j^c) = \sqrt{(X(B_i^c) - X(P_j^c))^2 + (y(B_i^c) - y(P_j^c))^2} \quad (1)$$

where B and P denote bounding box and body key point, respectively. X(*) and Y(*) are the coordinates of a center point of a bounding (referred to as a box center) and a key point. The superscript c denotes the body part class (e.g., face, hands, etc.). The subscript i, j denotes the pair of box and key point to be associated.

The object association engine 450 may use a solution, such as a Hungarian algorithm, to identify a one-to-one alignment a face bounding box and corresponding head key point, and hand bounding boxes and corresponding hand wrist key points of the person. After the object association engine 450 identifies the correspondence between the face bounding box, the hand bounding boxes, and the body points, the relationship between a person bounding box and his/her face and hands is also found. The object association engine 450 may also construct a container for person tracking so if one or more body parts are not detected due occlusion or other challenging visual conditions, the object association engine 450 will still not lose track of the person.

In some aspects, the two dimensional association is sufficient. However, in the case of occlusion, such as when a foreground person is partially in front of a background person, the bounding boxes may be occluded. In this aspect, the object association engine 450 may determine that object identification and association may fail. For example, the object association engine 450 may determine that a first object is likely to be incorrectly assigned to a second object because key points are close to each other.

In some aspects, 3D information such as depth may be used in the cost functions. Equation 2 below identifies the cost functions that are produced for the hands and the face:

$$\text{cost}(B_i^c, P_j^c) = \\ \sqrt{(X(B_i^c) - X(P_j^c))^2 + (y(B_i^c) - y(P_j^c))^2} + \lambda |Z(B_i^c) - Z(P_j^c)| \quad (2)$$

where B and P denote a bounding box and a body key point, respectively, X(*) and Y(*) are the coordinates of box center and key point, Z(*) indicates the average depth of the bounding box or the surrounding area of the key point, the superscript c denotes the body part class (e.g., face or hand), the subscript i, j denotes the pair of box and key point to be associated, and λ is the hyperparameter for the weight of depth cost. For example, if the classifier 440 outputs m person and n hand objects, Equation 2 will produce a m×n matrix of cost values that are input to the Hungarian algorithm.

As shown in FIG. 3, in a typical in-cabin occupancy monitoring scenario when two people are mostly overlapped, the two-dimensional (2D) association approach depicted in the previous section is likely to fail as one person's body key points are closer to another person's body part boxes in 2D. Such ambiguity happens more often under extreme visual conditions as key point detection tends to be less accurate. In this case, if depth information of the boxes and key points is known, we can simply add up the depth to the distance cost computation, which will penalize the association between the front and rear person containers.

Figure 5A:
FIGS. 5A and 5B illustrate example results of bounding boxes identified from an image in accordance with aspects of the disclosure.

FIG. 5A illustrates an example result of bounding boxes identified from an image in accordance with aspects of the disclosure. In this aspect, four people are identified using a 2D detection. In this case, a first person 610 is overlapping a second person 620, with the second person 620 being behind the first person. In this case, a hand 630 of the second person 620 is incorrectly identified as being a hand of the first person 610.

Figure 5B:

FIG. 5B illustrates another example result of bounding boxes identified from an image in accordance with aspects of the disclosure. In this aspect, the same image from FIG. 5A is used, and four people are identified using 3D detection. As described above, a first person 610 is overlapping a second person 620, with the second person 620 being behind the first person. However, a hand 630 of the second person 620 is correctly identified as being a hand of the second person 620 because the depth of the hand 630 is correctly associated with the second person 620.

Figure 6:
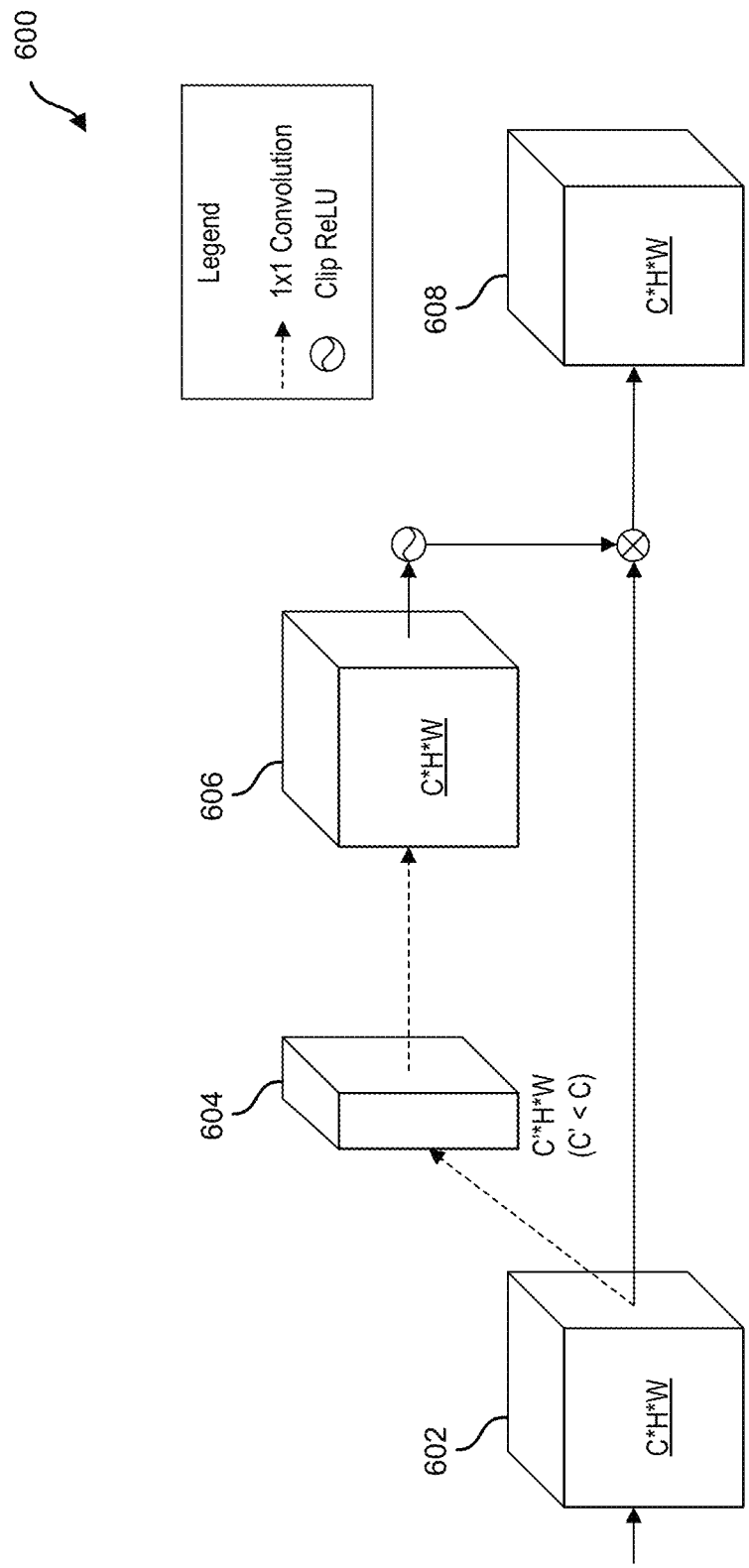
FIG. 6 illustrates an example joint attention module (JAM) that is configured to identify related channels similar to squeeze and excitation blocks

FIG. 6 illustrates an example JAM 600 that can be used by the the multitask detection system 304, the various detection engines 310, 320, 330, 340, and/or the depth estimation engine 350 of FIG. 3. In some aspects, squeeze and excitation blocks adaptively recalibrate channel-wise feature responses by modeling interdependencies between channels to improve the detection of features. In some aspects, the squeeze and excitation blocks may not be processable by hardware features and available libraries may not support squeeze and excitation blocks.

In one illustrative aspect, the JAM 600 maintains the weights and the height dimensions and instead uses 1×1 convolutions to decrease the channel numbers. Unlike squeeze and excitation blocks, the JAM 600 does not squeeze the spatial location of the input feature map. By using the 1×1 convolution, the JAM performs a channel-wise attention similar to a cross-attention between different channels in a squeeze and excitation block. Another convolution is performed to return the information to the original dimensions. In a further aspect, the JAM may implement a clip ReLU in place of a sigmoid operation. A sigmoid operation is a non-linear operation and a ReLU clip is a linear operation that clips input values between 0 and 1 to approximate a normalization function performed by a sigmoid operation. However, the clip ReLU is much faster than a sigmoid operation. In some aspects, the functions performed by the JAM may be performed in hardware, which has a greater efficiency as compared to software computation.

As shown in FIG. 6, the JAM 600 receives as input a feature map 602, which can include a number of features in a tensor or other representation. The feature map 602 can be of any shape, and is shown as having dimensions of C*H*W (corresponding to a number of Channels (C), each having a height (H) and a width (W). The JAM 600 first applies a 1×1 convolution to generate a tensor (or other representation) having reduced number of channels as compared to the input feature map 602 (e.g., reducing the channels from C to C', with C'<C). The JAM 600 can then apply another 1×1 convolution to reshape the tensor (or other representation) to a feature map 606 having the original size of C*H*W. The output feature map 606 from the second 1×1 convolution layer can be passed into an activation function (e.g., a ReLU layer) for activation, the output of which is then normalized or clipped to [0, 1] at the feature level (or pixel level) using a Clip operation (e.g., the clip ReLU operation of FIG. 7B) as a pixel-wise attention. The normalized/clipped feature map values can then be combined (e.g., using a combining engine) the feature values of the original input feature map 602. For example, the normalized/clipped feature map values can be multiplied by the feature values of the original input feature map 602 to obtain the final output feature map 608 having the same shape of C*H*W. The pipeline of the JAM 600 can thus effectively and efficiently perform an attention mechanism across different feature maps.

Figure 7A:
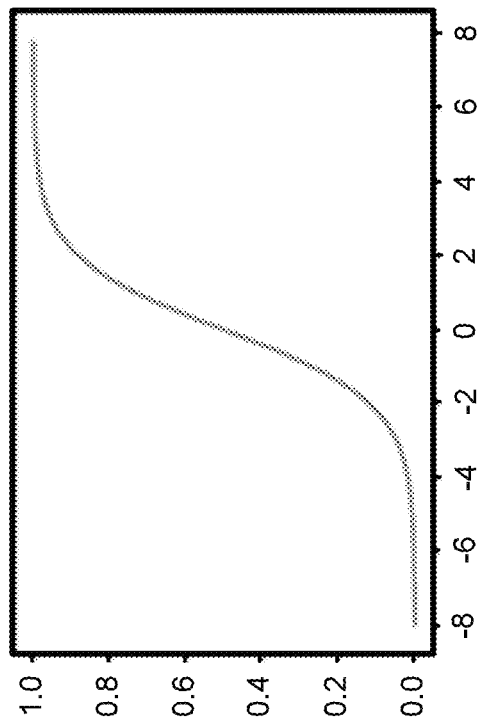
FIG. 7A illustrates an image of a sigmoid operation that is performed in squeeze and excitation blocks.

FIG. 7A is a graph 705 illustrating an example of a sigmoid operation that is performed in squeeze and excitation blocks. As illustrated in FIG. 7A, the sigmoid is a non-linear operation that normalizes the layer. This operation becomes expensive when the sigmoid operation is performed many times, such as when performing object detection of many objects.

Figure 7B:
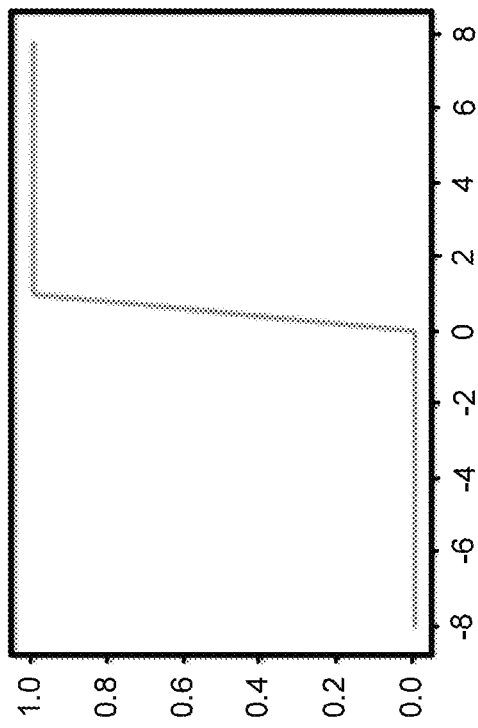
FIG. 7B illustrates an image of a clip rectified linear unit (ReLU) operation that is performed in a JAM in accordance with aspects of the disclosure.

FIG. 7B is a graph 710 illustrating an example of a clip ReLU operation that can be performed by the JAM 600, in accordance with aspects of the disclosure. As illustrated in FIG. 7B, the clip ReLU is a Boolean operation that approximates the function of the sigmoid operation and can be implemented in existing hardware without requiring any hardware changes. In some cases, the hardware can be modified to allow sigmoid operations or squeeze and excitation operations, but adding additional specialty functional blocks into an integrated circuit (IC) is time consuming and expensive.

Figure 8:
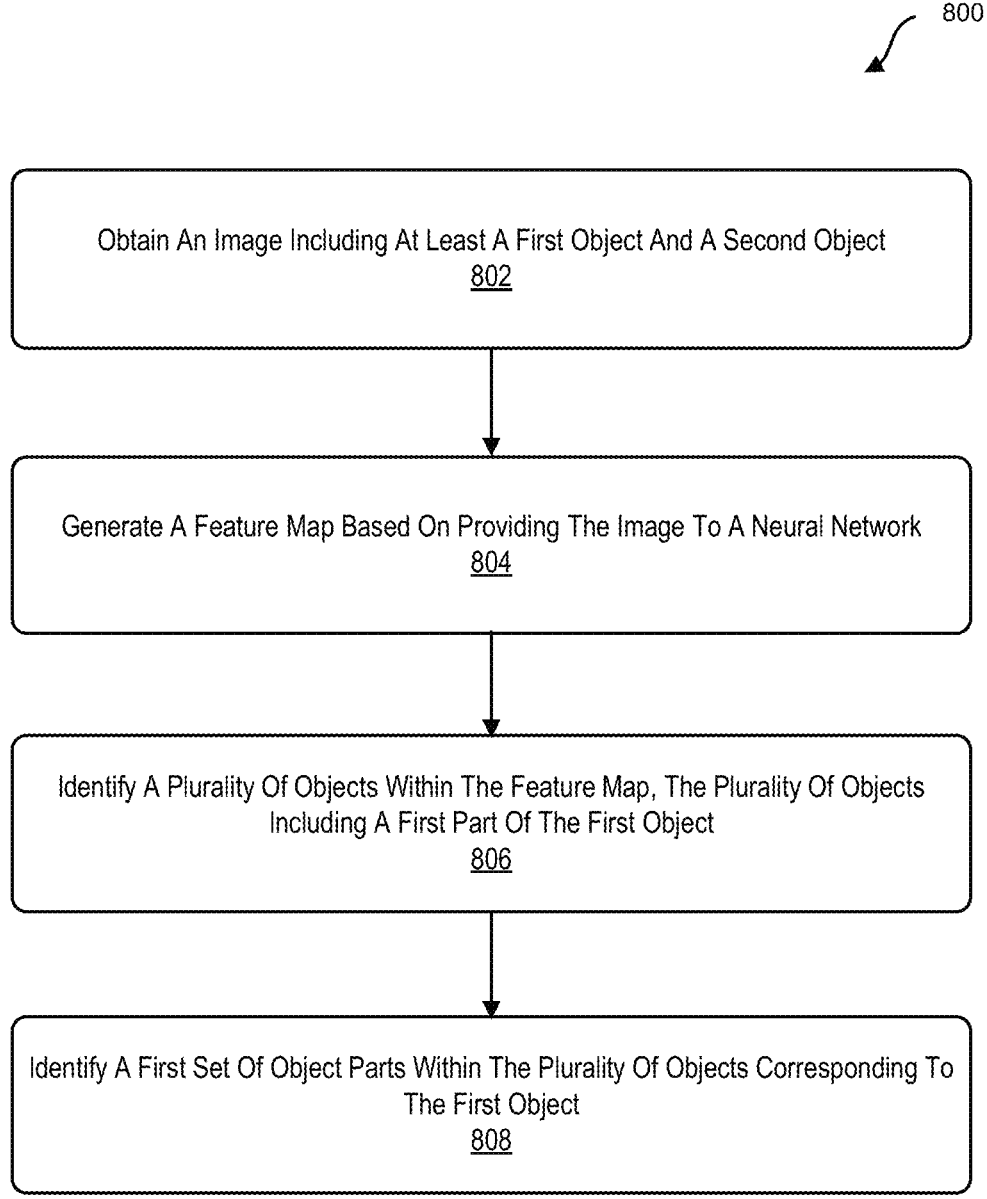
FIG. 8 is a flowchart illustrating an example of a method for performing object part association, in accordance with certain aspects of the present disclosure.

FIG. 8 is a flowchart illustrating an example of a method 800 for processing image data, in accordance with certain aspects of the present disclosure. The method 800 can be performed by a computing device (or a component of the computing device), such as a computing device including the system 300 of FIG. 3. In one illustrative example, the computing device can be the computing system 1000 configured to perform all or part of the method 800. In some cases, the computing system 1000 can include the system 300 of FIG. 3.

At block 802, the computing system (e.g., the system 300, the computing system 1000, etc.) is configured to obtain an image including at least a first object. In some aspects, the image can include a plurality of objects such as a face, a group of people, mammals, or other animated objects such as machines or vehicles.

At block 804, the computing system is configured to generate (e.g., using the multitask detection system 304 of FIG. 3) a feature map based on providing the image to a neural network. At block 806, the computing system (e.g., using the FPN 308 of FIG. 3). For example, the plurality of objects can include a first part of the first object. In one aspect, the first part of the first object includes a face of a first person, and the first set of object parts includes at least one body part of the first person.

In some aspects, the computing system may be configured to generate a first container (e.g., a bounding box or other bounding region) corresponding to the first object based on the first set of object parts. For example, the container may include the face and the at least one body part (e.g., the limbs of the person). In such aspects, the computing system may be configured to generate a respective bounding box for each of the plurality of objects. In one illustrative aspect, the computing system may generate at least one cost function based on the keypoints and the bounding boxes and may map the bounding boxes and the keypoints to corresponding parts of the first object. According to this aspect, the first container is generated based on at least one mapped part of the first object. After generating the bounding boxes, the computing system may determine keypoints for at least a portion of the first set of object parts, and map the keypoints to corresponding bounding boxes.

In some aspects, when the computing system generates the first container, the computing system may be configured to determining the identification of at least one part of the first set of object parts based a second object in the image. According to this aspect, the at least one part of the first set of object parts may fail identification based on the second object in the image. For example, the second object may occlude the first object and parts of the first object may appear to be more proximate to the second object. In some aspects, to identifying the plurality of objects, the computing system may generate a respective bounding box for each of the plurality of objects, determine keypoints for at least a portion of the first set of object parts, and map the keypoints to corresponding bounding boxes of other object parts in the same set. The computing system may then determine a respective depth associated with each of the plurality of objects, generate at least one cost function based on the keypoints, the bounding boxes, and the respective depth associated with each of the plurality of objects, and map the bounding boxes and the keypoints to corresponding parts of the first object and the second object based on the at least one cost function. In this case, the first container is generated based on at least one mapped part of the first object.

In some aspects, the neural network includes at least one joint attention module (e.g., the JAM 600 of FIG. 6). The joint attention module is configured to generate the feature map and includes at least one one-by-one convolution operation, at least one convolution operation, a clipping function, and a combining engine. The at least one one-by-one convolution operation is configured to obtain an input feature map and generate a first intermediate feature map including a decreased number of channels as compared to the input feature map. The at least one convolution operation is configured to generate a second intermediate feature map having a same dimension as the input feature map, and the clipping function is configured to clip feature values of the second intermediate feature map. The combining engine is configured to combine feature values of the input feature map with the clipped features values to generate the feature map.

At block 808, the computing system is configured to identifying a first set of object parts within the plurality of objects corresponding to the first object. In some aspects, the first set of object parts may be partially occluded by other objects as described above.

Figure 9:
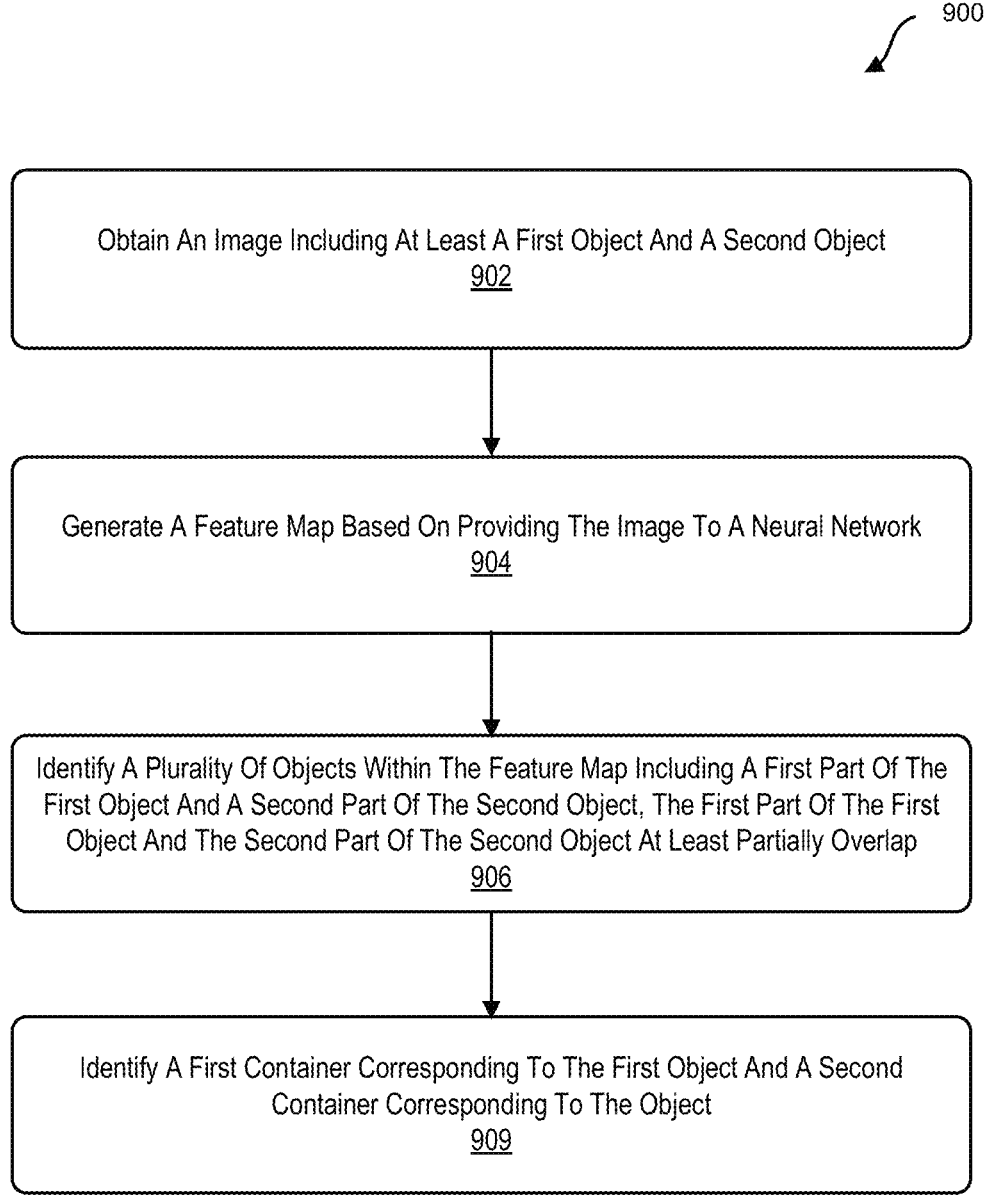
FIG. 9 is a flowchart illustrating an example of a method for performing object part association, in accordance with certain aspects of the present disclosure.

FIG. 9 is a flowchart illustrating an example of a method 900 for processing image data, in accordance with certain aspects of the present disclosure. The method 900 can be performed by a computing device (or a component of the computing device) having an touch screen, such as a mobile wireless communication device, a smart speaker, a camera, an XR device, a wireless-enabled vehicle, or another computing device. In one illustrative example, a computing system 1000 can be configured to perform all or part of the method 800.

At block 902, the computing system (e.g., the computing system 1000) is configured to obtain an image including at least a first object and a second object. In some aspects, the first object may at least partially occlude the second object, or vice-versa. For example, the first object may be in the foreground and the second object may be in the background.

At block 904, the computing system is configured to generate a feature map based on providing the image to a neural network. In some aspects, the neural network identifies various features such as objects of interest within the image. The objects can be part of other objects. For example, the object can be a face, which is a part of a person. The objects can also be other types of objects, such as dynamic objects (e.g., vehicles, machines, etc.), other mammals, vegetation, and so forth.

At block 906, the computing system is configured to identify a plurality of objects based on the feature map. In some aspects, the plurality of objects include a first part of the first object and a second part of the second object. The first part of the first object and the second part of the second object at least partially overlap.

In some aspects, the computing system is configured to determine a respective depth of each object of the plurality of objects associated with the feature map.

At block 908, the computing system is configured to identify a first container corresponding to the first object and a second container corresponding to the second object. In some aspects, the first part of the first object and the second part of the second object are assigned the first container based on a depth of the first part of the first object and a depth of the second part of the second object. For example, the first object comprises a first person, the second object comprises a second person, the first part comprises a body part or a face of the first person, and the second part comprising a body part or a face of the second person.

In one aspect, to identify containers in block 908, the computing system may identify parts of the first person and parts of the first person from the plurality of objects at least partially based on a respective depth of each object, and then determine a first container for tracking the first person in a subsequent image and a second container for tracking the second person in the subsequent image. In this case, the second part of the second person may overlap or occlude a portion of the first person and the depth may be used to disambiguate containers for the first person and the second person. The first object is entirely contained within the first container, and wherein the second object is entirely contained within the second container.

In some examples, the processes described herein (e.g., methods 800 and 900, and/or other process described herein) may be performed by a computing device or apparatus. In one example, the methods 800 and 900 can be performed by a computing device including a touch screen having a computing architecture of the computing system 1000 shown in FIG. 9.

The computing device can include any suitable device, such as a mobile device (e.g., a mobile phone), a desktop computing device, a tablet computing device, a wearable device (e.g., a virtual reality (VR) headset, an augmented reality (AR) headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the methods 500 and 900. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other type of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The methods 800 and 900 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The methods 800 and 900 and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1000 includes at least one processing unit (CPU or processor) 1010 and connection 1005 that couples various system components including system memory 1015, such as ROM 1020 and RAM 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for processing image data, comprising: obtaining an image including at least a first object; generating a feature map based on providing the image to a neural network; identifying a plurality of objects based on the feature map, the plurality of objects including a first part of the first object; and identifying a first set of object parts within the plurality of objects corresponding to the first object.

Aspect 2. The method of Aspect 1, wherein the first part of the first object comprises a face of a first person.

Aspect 3. The method of Aspect 2, wherein the first set of object parts includes at least one body part of the first person.

Aspect 4. The method of any of Aspects 1 to 3, further comprising: generating a first container corresponding to the first object based on the first set of object parts.

Aspect 5. The method of Aspect 4, wherein identifying the plurality of objects based on the feature map comprises: generating a respective bounding box for each of the plurality of objects; determining keypoints for at least a portion of the first set of object parts; and mapping the keypoints to corresponding bounding boxes.

Aspect 6. The method of Aspect 5, further comprising: generating at least one cost function based on the keypoints and the bounding boxes; and mapping the bounding boxes and the keypoints to corresponding parts of the first object, wherein the first container is generated based on at least one mapped part of the first object.

Aspect 7. The method of any of Aspects 5 to 6, wherein identifying the first set of object parts within the plurality of objects corresponding to the first object comprises: determining that identification of at least one part of the first set of object parts based a second object in the image.

Aspect 8. The method of Aspect 7, wherein the at least one part of the first set of object parts will fail identification based on the second object in the image.

Aspect 9. The method of any of Aspects 7 to 8, wherein identifying the plurality of objects based on the feature map comprises: generating a respective bounding box for each of the plurality of objects; determining keypoints for at least a portion of the first set of object parts; and mapping the keypoints to corresponding bounding boxes.

Aspect 10. The method of Aspect 9, further comprising: determining a respective depth associated with each of the plurality of objects; generating at least one cost function based on the keypoints, the bounding boxes, and the respective depth associated with each of the plurality of objects; and mapping the bounding boxes and the keypoints to corresponding parts of the first object and the second object based on the at least one cost function, wherein the first container is generated based on at least one mapped part of the first object.

Aspect 11. The method of any of Aspects 1 to 10, wherein the neural network comprises at least one joint attention module.

Aspect 12. The method of Aspect 11, wherein the at least one joint attention module is configured to generate the feature map, the at least one joint attention module comprising at least one one-by-one convolution operation configured to obtain an input feature map and generate a first intermediate feature map including a decreased number of channels as compared to the input feature map, at least one convolution operation configured to generate a second intermediate feature map having a same dimension as the input feature map, and a clipping function configured to clip feature values of the second intermediate feature map, and a combining engine configured to combine feature values of the input feature map with the clipped features values to generate the feature map.

Aspect 13. An apparatus for processing images, including at least one memory and at least one processor coupled to the at least one memory and configured to: obtain an image including at least a first object; generate a feature map based on providing the image to a neural network; identify a plurality of objects based on the feature map, the plurality of objects including a first part of the first object; and identify a first set of object parts within the plurality of objects corresponding to the first object.

Aspect 14. The apparatus of Aspect 13, wherein the first part of the first object comprises a face of a first person.

Aspect 15. The apparatus of Aspect 14, wherein the first set of object parts includes at least one body part of the first person.

Aspect 16. The apparatus of any of Aspects 13 to 15, wherein the at least one processor is configured to: generate a first container corresponding to the first object based on the first set of object parts.

Aspect 17. The apparatus of Aspect 16, wherein the at least one processor is configured to: generate a respective bounding box for each of the plurality of objects; determine keypoints for at least a portion of the first set of object parts; and map the keypoints to corresponding bounding boxes.

Aspect 18. The apparatus of Aspect 17, wherein the at least one processor is configured to: generate at least one cost function based on the keypoints and the bounding boxes; and map the bounding boxes and the keypoints to corresponding parts of the first object, wherein the first container is generated based on at least one mapped part of the first object.

Aspect 19. The apparatus of any of Aspects 17 to 18, wherein the at least one processor is configured to: determine that identification of at least one part of the first set of object parts based a second object in the image.

Aspect 20. The apparatus of Aspect 19, wherein the at least one part of the first set of object parts will fail identification based on the second object in the image.

Aspect 21. The apparatus of any of Aspects 19 to 20, wherein the at least one processor is configured to: generate a respective bounding box for each of the plurality of objects; determine keypoints for at least a portion of the first set of object parts; and map the keypoints to corresponding bounding boxes.

Aspect 22. The apparatus of Aspect 21, wherein the at least one processor is configured to: determine a respective depth associated with each of the plurality of objects; generate at least one cost function based on the keypoints, the bounding boxes, and the respective depth associated with each of the plurality of objects; and map the bounding boxes and the keypoints to corresponding parts of the first object and the second object based on the at least one cost function, wherein the first container is generated based on at least one mapped part of the first object.

Aspect 23. The apparatus of any of Aspects 13 to 22, wherein the neural network comprises at least one joint attention module.

Aspect 24. The apparatus of Aspect 23, wherein the at least one joint attention module is configured to generate the feature map, the at least one joint attention module comprising at least one one-by-one convolution operation configured to obtain an input feature map and generate a first intermediate feature map including a decreased number of channels as compared to the input feature map, at least one convolution operation configured to generate a second intermediate feature map having a same dimension as the input feature map, and a clipping function configured to clip feature values of the second intermediate feature map, and a combining engine configured to combine feature values of the input feature map with the clipped features values to generate the feature map.

Aspect 25. A method for processing images, comprising: obtaining an image including at least a first object and a second object; generating a feature map based on providing the image to a neural network; identifying a plurality of objects based on the feature map, the plurality of objects including a first part of the first object and a second part of the second object, wherein the first part of the first object and the second part of the second object at least partially overlap; and identifying a first container corresponding to the first object and a second container corresponding to the second object.

Aspect 26. The method of Aspect 25, further comprising: determining a respective depth of each object of the plurality of objects associated with the feature map.

Aspect 27. The method of any of Aspects 25 to 26, wherein the first part of the first object and the second part of the second object are assigned the first container based on a depth of the first part of the first object and a depth of the second part of the second object.

Aspect 28. The method of any of Aspects 25 to 27, wherein the first object comprises a first person, the second object comprises a second person, the first part comprising a body part or a face of the first person, and the second part comprising a body part or a face of the second person.

Aspect 29. The method of Aspect 28, further comprising: identifying parts of the first person and parts of the first person from the plurality of objects at least partially based on a respective depth of each object; and determining a first container for tracking the first person in a subsequent image and a second container for tracking the second person in the subsequent image.

Aspect 30. The method of any of Aspects 25 to 29, wherein the first object is entirely contained within the first container, and wherein the second object is entirely contained within the second container.

Aspect 31. An apparatus for processing images including at least one memory and at least one processor coupled to the at least one memory and configured to: obtain an image including at least a first object and a second object; generate a feature map based on providing the image to a neural network; identify a plurality of objects based on the feature map, the plurality of objects including a first part of the first object and a second part of the second object, wherein the first part of the first object and the second part of the second object at least partially overlap; and identify a first container corresponding to the first object and a second container corresponding to the second object.

Aspect 32. The apparatus of Aspect 31, wherein the at least one processor is configured to: determine a respective depth of each object of the plurality of objects associated with the feature map.

Aspect 33. The apparatus of any of Aspects 31 to 32, wherein the first part of the first object and the second part of the second object are assigned the first container based on a depth of the first part of the first object and a depth of the second part of the second object.

Aspect 34. The apparatus of any of Aspects 31 to 33, wherein the first object comprises a first person, the first part comprising a body part or a face of the first person, and the second part comprising a body part or a face of the second person.

Aspect 35. The apparatus of Aspect 34, wherein the at least one processor is configured to: identify parts of the first person and parts of the first person from the plurality of objects at least partially based on a respective depth of each object; and determine a first container for tracking the first person in a subsequent image and a second container for tracking the second person in the subsequent image.

Aspect 36. The apparatus of any of Aspects 31 to 35, wherein the first object is entirely contained within the first container, and wherein the second object is entirely contained within the second container.

Aspect 37: A non-transitory computer-readable medium comprising instructions which, when executed by one or more processors, cause the one or more processors to perform operations according to any of Aspects 1 to 12.

Aspect 38: An apparatus comprising means for performing operations according to any of Aspects 1 to 12.

Aspect 39: A non-transitory computer-readable medium comprising instructions which, when executed by one or more processors, cause the one or more processors to perform operations according to any of Aspects 25 to 30.

Aspect 40: An apparatus comprising means for performing operations according to any of Aspects 25 to 30.

What is claimed is:

1. A method for processing image data, comprising:
obtaining an image including at least a first object;
generating a feature map based on providing the image to a neural network;
generating a respective bounding box for each of a plurality of objects based on the feature map, the plurality of objects including a first part of the first object;
identifying a first set of object parts within the plurality of objects corresponding to the first object;
determining a respective depth associated with each of the plurality of objects;
determining keypoints for at least a portion of the first set of object parts;
generating at least one cost function based on the keypoints, the respective bounding box for each of the plurality of objects, and the respective depth associated with each of the plurality of objects;

mapping the respective bounding box for each of the plurality of objects and the keypoints to corresponding parts of the first object and a second object in the image based on the at least one cost function; and generating a first container corresponding to the first object based on at least one mapped part of the first object.

2. The method of claim 1, wherein the first part of the first object comprises a face of a first person.

3. The method of claim 2, wherein the first set of object parts includes at least one body part of the first person.

4. The method of claim 1, wherein identifying the first set of object parts within the plurality of objects corresponding to the first object comprises:

determining an identification of at least one part of the first set of object parts based on the second object in the image.

5. The method of claim 4, wherein the at least one part of the first set of object parts will fail identification based on the second object in the image.

6. The method of claim 1, wherein the neural network comprises at least one joint attention module.

7. The method of claim 6, wherein the at least one joint attention module is configured to generate the feature map, the at least one joint attention module comprising at least one one-by-one convolution operation configured to obtain an input feature map and generate a first intermediate feature map including a decreased number of channels as compared to the input feature map, at least one convolution operation configured to generate a second intermediate feature map having a same dimension as the input feature map, and a clipping function configured to clip feature values of the second intermediate feature map, and a combining engine configured to combine feature values of the input feature map with the clipped features values to generate the feature map.

8. An apparatus for processing images, comprising:
at least one memory; and
at least one processor coupled to the at least one memory and configured to:
obtain an image including at least a first object;
generate a feature map based on providing the image to a neural network;
generate a respective bounding box for each of a plurality of objects based on the feature map, the plurality of objects including a first part of the first object;
identify a first set of object parts within the plurality of objects corresponding to the first object;
determine a respective depth associated with each of the plurality of objects;
determine keypoints for at least a portion of the first set of object parts;
generate at least one cost function based on the keypoints, the respective bounding box for each of the plurality of objects, and the respective depth associated with each of the plurality of objects;
map the respective bounding box for each of the plurality of objects and the keypoints to corresponding parts of the first object and a second object in the image based on the at least one cost function; and
generate a first container corresponding to the first object based on at least one mapped part of the first object.

9. The apparatus of claim 8, the first part of the first object comprises a face of a first person.

10. The apparatus of claim 9, the first set of object parts includes at least one body part of the first person.

11. The apparatus of claim 8, wherein the at least one processor is configured to:
determine an identification of at least one part of the first set of object parts based on the second object in the image.

12. The apparatus of claim 11, wherein the at least one part of the first set of object parts will fail identification based on the second object in the image.

13. The apparatus of claim 8, wherein the neural network comprises at least one joint attention module.

14. The apparatus of claim 13, wherein the at least one joint attention module is configured to generate the feature map, the at least one joint attention module comprising at least one one-by-one convolution operation configured to obtain an input feature map and generate a first intermediate feature map including a decreased number of channels as compared to the input feature map, at least one convolution operation configured to generate a second intermediate feature map having a same dimension as the input feature map, and a clipping function configured to clip feature values of the second intermediate feature map, and a combining engine configured to combine feature values of the input feature map with the clipped features values to generate the feature map.

15. A non-transitory computer-readable medium having stored thereon instructions that, when executed by at least one processor, cause the at least one processor to:
obtain an image including at least a first object;
generate a feature map based on providing the image to a neural network;
generate a respective bounding box for each of a plurality of objects based on the feature map, the plurality of objects including a first part of the first object;
identify a first set of object parts within the plurality of objects corresponding to the first object;
determine a respective depth associated with each of the plurality of objects;
determine keypoints for at least a portion of the first set of object parts;
generate at least one cost function based on the keypoints, the respective bounding box for each of the plurality of objects, and the respective depth associated with each of the plurality of objects;
map the respective bounding box for each of the plurality of objects and the keypoints to corresponding parts of the first object and a second object in the image based on the at least one cost function; and
generate a first container corresponding to the first object based on at least one mapped part of the first object.

16. The non-transitory computer-readable medium of claim 15, the first part of the first object comprises a face of a first person.

17. The non-transitory computer-readable medium of claim 16, the first set of object parts includes at least one body part of the first person.

18. The non-transitory computer-readable medium of claim 15, wherein the at least one processor is configured to:
determine an identification of at least one part of the first set of object parts based on the second object in the image.

19. The non-transitory computer-readable medium of claim 18, wherein the at least one part of the first set of object parts will fail identification based on the second object in the image.

20. The non-transitory computer-readable medium of claim 15, wherein the neural network comprises at least one joint attention module.

21. The non-transitory computer-readable medium of claim 20, wherein the at least one joint attention module is configured to generate the feature map, the at least one joint attention module comprising at least one one-by-one convolution operation configured to obtain an input feature map and generate a first intermediate feature map including a decreased number of channels as compared to the input feature map, at least one convolution operation configured to generate a second intermediate feature map having a same dimension as the input feature map, and a clipping function configured to clip feature values of the second intermediate feature map, and a combining engine configured to combine feature values of the input feature map with the clipped features values to generate the feature map.

* * * * *